US008855643B2

(12) United States Patent
Zhao

(10) Patent No.: US 8,855,643 B2
(45) Date of Patent: Oct. 7, 2014

(54) METHOD FOR IMPROVING HANDOVER SUCCESS RATE OF GROUP MOBILE TERMINALS, MOBILE PROXY, AND MOBILE TERMINAL

(71) Applicant: Huawei Technologies Co., Ltd., Shenzhen (CN)

(72) Inventor: Hongxia Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/718,545

(22) Filed: Dec. 18, 2012

(65) Prior Publication Data

US 2013/0122908 A1    May 16, 2013

Related U.S. Application Data

(63) Continuation of application No. PCT/CN2011/073914, filed on May 11, 2011.

(30) Foreign Application Priority Data

Jun. 21, 2010  (CN) .......................... 2010 1 0208038

(51) Int. Cl.
*H04W 36/00*   (2009.01)
*H04W 36/16*   (2009.01)
*H04W 36/08*   (2009.01)
*H04W 60/04*   (2009.01)

(52) U.S. Cl.
CPC ............ *H04W 36/165* (2013.01); *H04W 60/04* (2013.01); *H04W 36/08* (2013.01)
USPC .......................................................... 455/436

(58) Field of Classification Search
USPC ................... 455/436–450, 403, 404.1, 404.2; 370/331, 328, 315, 332, 329
See application file for complete search history.

(56) References Cited

U.S. PATENT DOCUMENTS

2004/0072565 A1    4/2004  Nobukiyo et al.
2007/0258407 A1*   11/2007 Li et al. .......................... 370/331
(Continued)

FOREIGN PATENT DOCUMENTS

CN           1735269 A      2/2006
CN         101238743 A      8/2008
(Continued)

OTHER PUBLICATIONS

Written Opinion of the International Searching Authority issued in corresponding PCT Patent Application No. PCT/CN2011/073914, mailed Aug. 18, 2011.

(Continued)

*Primary Examiner* — Kiet Doan
(74) *Attorney, Agent, or Firm* — Brinks Gilson & Lione

(57) ABSTRACT

A method for improving a handover success rate of a group of mobile terminals include obtaining a minimum backoff time value according to obtained access parameters, receiving a message from a mobile terminal after entering a new cell, and sending the message to a base station if the message is a handover request message. If the message is not a handover request message, the method includes sending the received message to the base station upon expiry of a predetermine time after the message is received. The predetermined time is greater than or equal to the minimum backoff time value, and the minimum backoff time value is a minimum time value of the predetermined time when the received message from the mobile terminal is not the handover request message.

7 Claims, 3 Drawing Sheets

(56) References Cited

U.S. PATENT DOCUMENTS

| | | |
|---|---|---|
| 2008/0020770 A1 | 1/2008 | Hofmann |
| 2008/0080427 A1* | 4/2008 | Suh et al. .................. 370/331 |
| 2009/0279434 A1 | 11/2009 | Aghvami et al. |
| 2010/0048207 A1 | 2/2010 | Lecompte |
| 2011/0217982 A1 | 9/2011 | Zhao |
| 2012/0014348 A1 | 1/2012 | Tanno et al. |

FOREIGN PATENT DOCUMENTS

| | | |
|---|---|---|
| CN | 101494913 A | 7/2009 |
| CN | 101653034 A | 2/2010 |
| CN | 101742555 A | 6/2010 |
| WO | WO 2007/119168 A2 | 10/2007 |
| WO | WO 2007/129198 A2 | 11/2007 |

OTHER PUBLICATIONS

International Search Report issued in corresponding PCT Patent Application No. PCT/CN2011/073914, mailed Aug. 18, 2011.
Ericsson, "Improvement of Alternative 1 and 2" Agenda Item 10.4, 3GPP TSG SA WG2 Meeting #63. Athens, Greece, Feb. 18-22, 2008. TD S2-081280.
Vukovic et al., "Performance Analysis of the Random Access Channel (RACH) in WCDMA" VTC, IEEE 2001.
Office Action issued in corresponding Chinese Patent Application No. 201010208038.X, mailed Jul. 22, 2013, 11 pages.

* cited by examiner

US 8,855,643 B2

METHOD FOR IMPROVING HANDOVER SUCCESS RATE OF GROUP MOBILE TERMINALS, MOBILE PROXY, AND MOBILE TERMINAL

CROSS-REFERENCE TO RELATED APPLICATIONS

This application is a continuation of International Application No. PCT/CN2011/073914, filed on May 11, 2011, which claims priority to Chinese Patent Application No. 201010208038.X, filed on Jun. 21, 2010, both of which are hereby incorporated by reference in their entireties.

FIELD OF THE APPLICATION

The present application relates to communication technology field, and in particular, to a method for improving handover success rate of group mobile terminals, a mobile proxy, a mobile terminal, and a communication system.

BACKGROUND OF THE APPLICATION

A modern public terrestrial mobile communication network is based on a cellular architecture, in which location management is a core technology. The location management includes two aspects. One aspect is to trace location of an idle mobile terminal, and the other aspect is to keep service continuity after the location of the mobile terminal changes. The latter is called a handover technology. In an existing cellular network, two levels of location management are usually applied. The level-1 location management occurs in a cell, and the level-2 location management occurs in a Location Area (LA). One location area includes multiple cells. If a location area of an idle mobile terminal changes, the mobile terminal reports its new location information to the network initiatively.

FIG. 1 is a schematic structural diagram of a location area in the prior art. The location area includes multiple cells. Peripheral cells 11 (for example, cells filled with oblique lines in FIG. 1) are border cells (Broader Cell).

With development of the communication technology, cell coverage scope of the cellular network and coverage scope of the location area are smaller and smaller. Besides, with the development of rapid large-capacity vehicles, high-speed group movement becomes an important movement mode of the mobile terminals. When a high-speed vehicle moves from one cell to another, plenty of the mobile terminals need to hand over from one cell to another, which gives rise to a handover of group mobile terminals.

The handover technology of group mobile terminals in the cellular network in the prior art brings the following problems: taking the FIG. 1 as an example, when one high-speed vehicle enters the location area, the mobile terminals on the high-speed vehicle generate handover requests and location update requests. In FIG. 1, two special cells 11a (the cells filled with vertical lines in FIG. 1) exist in the border cells. The high-speed vehicle enters and leaves the location area through the two cells 11a respectively. The high-speed vehicle passes multiple cells 12 (the cells filled with panes) when moving in the location area. When the high-speed vehicle moves from one cell 12 to another cell 12, the mobile terminals in a connected mode on the high-speed vehicle hand over from one cell 12 to another cell 12. Therefore, handover request messages sent by the group mobile terminals are generated, and the handover request messages sent by the group mobile terminals may cause significant impact on access resources of a target cell and increase handover failure rate. When the high-speed vehicle moves from one location area to another location area, the border cells in the destination location area generate not only the handover request messages sent by the group mobile terminals, but also location update request messages sent by the group mobile terminals. The location update request messages sent by the group mobile terminals are much more than the handover request messages, thereby increasing the handover failure rate even more.

SUMMARY OF THE APPLICATION

Embodiments provide a method for improving handover success rate of group mobile terminals, a mobile proxy, a mobile terminal, and a communication system to overcome the high handover failure rate of the group mobile terminal handover in the prior art, and improve the handover success rate of the group mobile terminals.

A method for improving handover success rate of group mobile terminals is provided in an embodiment. The method includes:

obtaining a minimum backoff time value according to obtained access parameters;

receiving a message from a mobile terminal after entering a new cell; and if the message is a handover request message, sending the message to a base station; if the message is not a handover request message, sending the received message to the base station upon expiry of a preset time counted after the message is received, where the preset time is greater than or equal to the minimum backoff time value, and the minimum backoff time value is a minimum time value of the preset time when the message received from the mobile terminal is not a handover request message.

Another method for improving handover success rate of group mobile terminals is provided in an embodiment. The method includes:

receiving a minimum backoff time value sent by a base station; and sending a handover request message to the base station if handover needs to be initiated after entering a new cell; sending a location update request message to the base station upon expiry of a counted preset time if location update needs to be initiated, where the preset time is greater than or equal to the minimum backoff time value, and the minimum backoff time value is a minimum time value of the preset time.

A mobile proxy provided in an embodiment includes:

a first obtaining module, configured to obtain a minimum backoff time value according to obtained access parameters;

a first receiving module, configured to receive messages from group mobile terminals after the group mobile terminals enter a new cell; and a first processing module, configured to: if a message received by the first receiving module is a handover request message, send the message to a base station; if the message is not a handover request message, send the message received by the first receiving module to the base station upon expiry of a preset time counted after the first receiving module receives the message, where the preset time is greater than or equal to the minimum backoff time value, and the minimum backoff time value is a minimum time value of the preset time when the message received from the mobile terminal is not a handover request message.

A mobile terminal provided in an embodiment includes:

a second receiving module, configured to receive a minimum backoff time value sent by a base station; and a second processing module, configured to: send a handover request message to the base station if handover needs to be initiated after entering a new cell; send a location update request message to the base station upon expiry of a counted preset time, where the preset time is greater than or equal to the minimum backoff time value, and the minimum backoff time value is a minimum time value of the preset time.

A communication system provided in an embodiment includes a base station and mobile terminals described above. The base station is configured to obtain a minimum backoff time value, and send the minimum backoff time value to the mobile terminal.

In the method for improving the handover success rate of group mobile terminals, the mobile proxy, the mobile terminal, and the communication system in the embodiments, the minimum backoff time is obtained according to the obtained access parameters, and the message sent by the mobile terminal is received after the mobile terminal enters a new cell. The handover request message sent by the mobile terminal can be sent to the base station without delay, and the non-handover request message sent by the mobile terminal, such as location update request messages sent by the group mobile terminals, may be sent to the base station after being delayed for a preset time. In this way, it is ensured that the base station handles the handover request message first, the conflict between other messages and the handover request message is avoided, and the handover failure rate is reduced.

BRIEF DESCRIPTION OF THE DRAWINGS

To make the technical solutions or the prior art more comprehensible, the following outlines the accompanying drawings used in the description of the embodiments or the prior art. Apparently, the accompanying drawings outlined below are not exhaustive, and persons of ordinary skill in the art can derive other drawings from them without any creative effort.

DETAILED DESCRIPTION OF THE EMBODIMENTS

To make the objectives, technical solutions and advantages more comprehensible, the following describes the technical solutions thoroughly with reference to accompanying drawings. Evidently, the drawings and the detailed description are merely representative of particular embodiments rather than all embodiments. All other embodiments, which can be derived by persons of ordinary skill in the art from the embodiments without any creative effort, shall fall within the protection scope of the claims.

Figure 1:
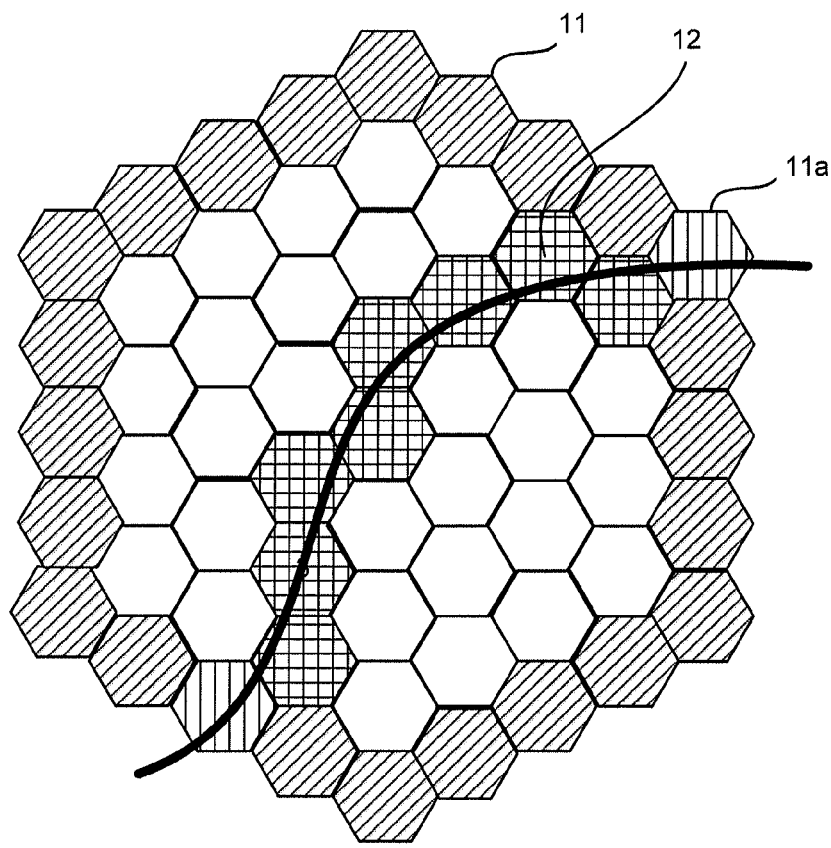
FIG. 1 is a schematic structural diagram of one location area in the prior art.
Figure 2:
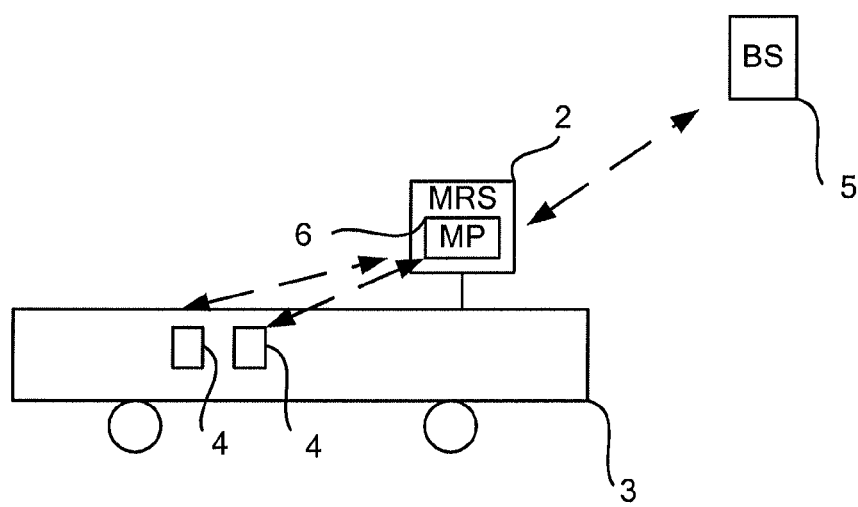
FIG. 2 is a schematic structural diagram of a handover system of group mobile terminals involved in all embodiments.

In a handover system of group mobile terminals, each mobile terminal in the group may communicate with the Base Station (BS) through a Mobile Relay Station (MRS). The MRS may be set in a vehicle that moves at a high speed. FIG. 2 is a schematic structural diagram of a handover system of group mobile terminals involved in all embodiments. MRS2 is set on train 3, and mobile terminal 4 on train 3 communicates with BS5 through MRS2, and specifically, may communicate with BS5 through a Mobile Proxy (MP) set in MRS2. The detailed handover method of group mobile terminals is shown in FIG. 3.

Figure 3:
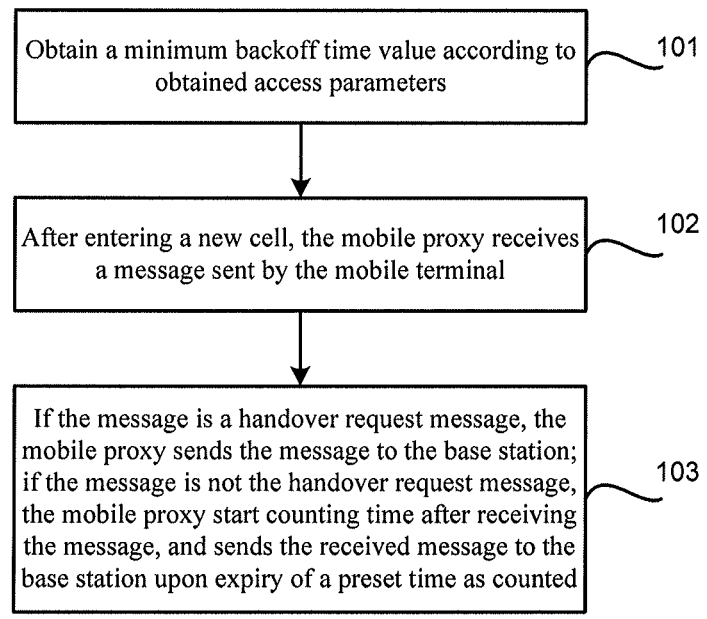
FIG. 3 is a flowchart of a handover method of group mobile terminals according to a first embodiment.

FIG. 3 is a flowchart of a handover method of group mobile terminals according to a first embodiment. The method includes:

Step 101: Obtain a minimum backoff time value according to obtained access parameters.

The access parameters include at least one of the parameters: number of mobile terminals in the group, movement speed of the group, access bandwidth of a new cell. The mobile proxy may pre-store various access parameters required, or obtain the access parameters from the message sent by the base station, for example, obtain the access bandwidth of the new cell from the message sent by the base station.

Alternatively, the mobile proxy may obtain various access parameters dynamically. That is, the mobile proxy receives a message from the mobile terminal and extracts relevant parameters from the message, thereby obtaining various required access parameters. For example, in a statistic sense, the number of mobile terminals in service is in a certain relationship with the amount of data of the mobile terminal covered by a current access point. As an example, the relationship is expressed by a formula $y=f(x)$, where x is the number of mobile terminals in service, y is the number of mobile terminals covered by the current access point, and f is a known function. Both the mobile terminal and the BS can obtain the number of mobile terminals in service, and therefore, obtain y naturally. The number of handover request messages sent by the group mobile terminals is x, and $y-x$ is the number of the location update request messages sent by the group mobile terminals.

Alternatively, various required access parameters may be obtained by the base station, and sent by the base station to the mobile proxy.

Step 102: After entering a new cell, the mobile proxy receives a message sent by the mobile terminal.

Step 103: If the message is a handover request message, the mobile proxy sends the message to the base station; if the message is not the handover request message, the mobile proxy start counting time after receiving the message, and sends the received message to the base station upon expiry of a preset time as counted. The preset time is greater than or equal to a minimum backoff time value. The minimum backoff time value is a minimum time value of the preset time when the message received from the mobile terminal is not a handover request message.

In step 101 above, apart from obtaining the minimum backoff time value, a maximum congestion adjustment time value may also be obtained according to the access parameters. In all embodiments, the minimum backoff time value and the maximum congestion adjustment time value are two time values which are used for sending non-handover access request messages to the base station after being delayed.

The messages received by the mobile proxy come in different types and have different features. Therefore, the mobile proxy needs to handle the messages differently, and obtain different preset times.

In step 102, if the received message is a call request message, the preset time may be equal to the minimum backoff time value. If the minimum backoff time value is greater than the time of waiting before the call request message is sent again, the call request message may be discarded.

If the received message is a location update request message sent by the group mobile terminals, the preset time may be greater than the minimum backoff time value, and less than or equal to the maximum congestion adjustment time value. The preset time may be a random value distributed evenly between the minimum backoff time value and the maximum congestion adjustment value.

The mobile proxy receives the location update request message sent by the group mobile terminals, and sets the preset time to a value greater than the minimum backoff time value, so as to avoid conflict between the location update request message and the handover request message, or sets the preset time to a value less than or equal to the maximum congestion adjustment time value to regulate the arrival rate of the location update request messages sent by the group mobile terminals and prevent congestion of the location update request messages sent by the group mobile terminals.

In the method provided in the first embodiment, after each mobile terminal in the group enters the new cell, if the sent message is the handover request message, the mobile proxy sends the message to the base station for processing immediately without delay; if the sent message is not the handover request message but the other message, the mobile proxy delays the message for the preset time, and then sends it to the base station. The purpose of such a practice is to let the base station prior to handle the handover request message. When both the handover request messages and the other messages are received from the group mobile terminals in a time period, the base station handle the handover request messages first, and handle the other messages later because the other messages are delayed by the mobile proxy for the preset time, thereby reducing the handover failure rate. Moreover, the mobile terminals may be the existing mobile terminals, and it is not necessary to change the function or structure of the mobile terminal. Therefore, the technical solution is well compatible with the existing cellular communication system.

Figure 4:
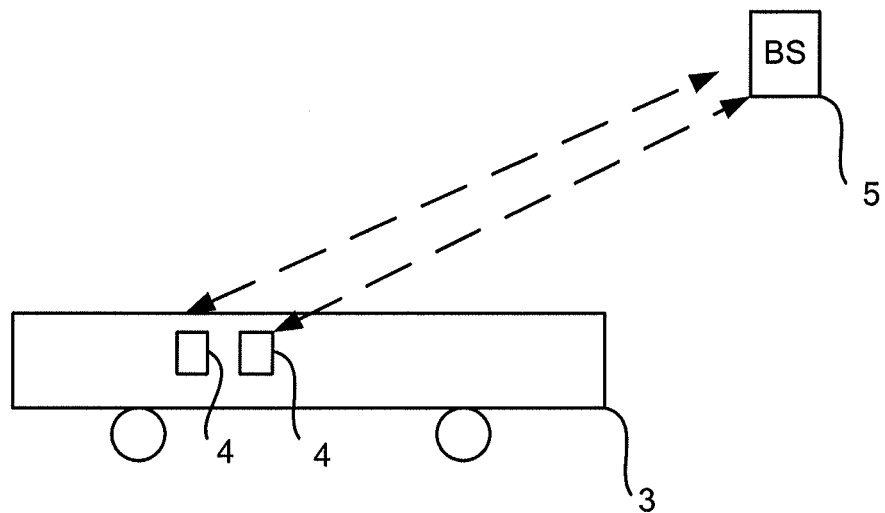
FIG. 4 is a schematic structural diagram of another handover system of group mobile terminals involved in all embodiments.

In the handover system of group mobile terminals, each mobile terminal in the group may communicate with the BS directly. FIG. 4 is a schematic structural diagram of another handover system of group mobile terminals involved in all embodiments, where mobile terminal 4 on train 3 communicates with BS5 directly. The system includes no MRS. The detailed handover method of group mobile terminals is shown in FIG. 5.

Figure 5:
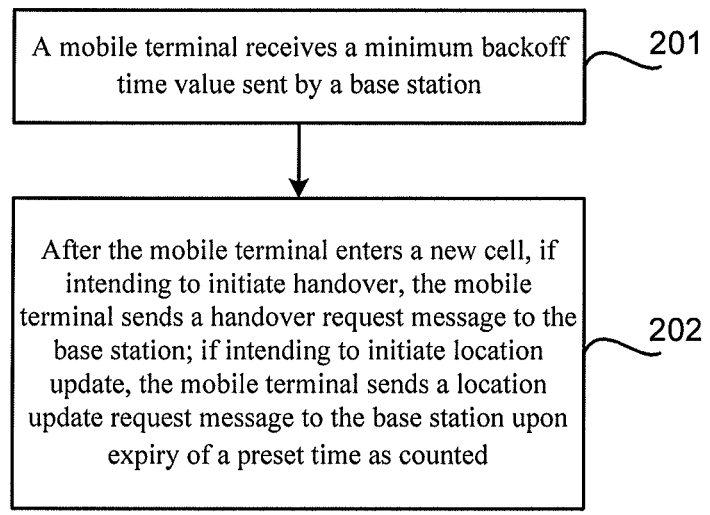
FIG. 5 is a flowchart of a handover method of group mobile terminals according to a second embodiment.

FIG. 5 is a flowchart of a handover method of group mobile terminals according to a second embodiment. The method includes:

Step 201: A mobile terminal receives a minimum backoff time value sent by a base station.

Before step 201, the base station may generate the minimum backoff time value according to various access parameters, and sends the minimum backup time value to the mobile terminal.

In an embodiment, the base station may pre-store the various access parameters.

Alternatively, in an embodiment, the base station may extract data out of the message sent by the mobile terminal, analyze the data, and obtain relevant access parameters according to the data. For example, in a statistic sense, the base station may obtain service arrival rate of the mobile terminal and average time of one service according to the number of times of the mobile terminals' initiating services in a time period and according to duration of each service. The two parameters are also important parameters for calculating the minimum backoff time value and the maximum congestion adjustment time value. For example, as described later herein, N is the number of location update requests sent by the group mobile terminals and may be calculated out according to the number of times of the mobile terminals' initiating services in the time period and according to the duration of each service.

Step 202: After the mobile terminal enters a new cell, if intending to initiate handover, the mobile terminal sends a handover request message to the base station; if intending to initiate location update, the mobile terminal sends a location update request message to the base station upon expiry of a preset time as counted. The preset time is greater than or equal to the minimum backoff time value. The minimum backoff time value is a minimum time value of the preset time.

Before step 201, the base station may obtain not only the minimum backoff time value, but also the maximum congestion adjustment time value according to the access parameters. The maximum congestion adjustment time value is maximum delay time value for adjusting arrival rate of the location update request messages. After obtaining the maximum congestion adjustment time value, the base station sends the maximum congestion adjustment time value to the mobile terminal.

In step 202, if the mobile terminal needs to send a call request message, the preset time may be equal to the minimum backoff time value. If an idle mobile terminal needs to initiate location update, the preset time may be greater than the minimum backoff time value, and less than or equal to the maximum congestion adjustment time value.

In the method provided in the second embodiment, after each mobile terminal in the group enters the new cell, if handover needs to be initiated, the mobile terminal sends the handover request message to the base station for processing immediately without delay; if location update rather than handover needs to be initiated, the mobile terminal delays the location update request message for a preset time, and then sends it to the base station. The purpose of such a practice is to let the base station prior to handle the handover request message. When both the handover request messages and the other messages are received from group mobile terminals in a time period, the base station handle the handover request messages first, and handle the other messages later because the other messages are delayed by the mobile proxy for the preset time, thereby reducing the handover failure rate.

In the embodiments shown in FIG. 3 and FIG. 5, the method for obtaining the minimum backoff time value and the maximum congestion adjustment time value according to the access parameters is the same. In the embodiment shown in FIG. 3, the two time values are obtained by the mobile proxy; in the embodiment shown in FIG. 5, the two time values are obtained by the base station. Supposing that the mobile proxy obtains the minimum backoff time value and the maximum congestion adjustment time value, the following describes the method for obtaining the minimum backoff time value and the maximum congestion adjustment time value. The method includes:

Step 401: According to the access parameters, obtain duration $T_{g\_ho}$ from the time of the group mobile terminals arriving at the cell to the time of the system access channel finishing handling the handover requests sent by all mobile terminals in the group, and obtain a time value $T_{g\_nlu}$ for regulating the arrival rate of the location update request messages sent by the group mobile terminals. $T_{g\_nlu}$ may depend on available bandwidth of the system and the number of the location update request messages sent by the group mobile terminals. Specifically, $T_{g\_nlu}=N/C$, where N is the number of the location update request messages sent by the group mobile terminals, C is the available bandwidth of the system, the value of C is related to the access bandwidth of the cell; the number of the location update request messages sent by the group mobile terminals is a result of subtracting the number of terminals that send a handover request in the group from the terminals number in the group, and the terminals number in the group is one of the access parameters obtained beforehand.

Step 402: Obtain the minimum backoff time value and the maximum congestion adjustment time value according to $T_{g\_ho}$ and $T_{g\_nlu}$.

Specifically, $t_{min} = \alpha T_{g\_ho}$, $t_{max} = t_{min} + \beta T_{g\_nlu}$, $t_{min}$ is the minimum backoff time value, $t_{max}$ is the maximum congestion adjustment time value, $\alpha$ and $\beta$ may be constants greater than or equal to 1, and less than or equal to 2, or other constants. The specific values depend on the system requirements. Typically, the values of $\alpha$ and $\beta$ are 1.

The following describes the method of obtaining $T_{g\_ho}$ in detail.

$T_{g\_ho}$ is primarily composed of two parts: One part is a difference $t_o$ between the time of sending the handover request by the last arrived mobile terminal in the group and the time of sending the handover request by the first arrived mobile terminal in the group, and the other part is the maximum duration $t_h$ required by the system access channel in handling one attempt of handover access. That is, $T_{g\_ho} = t_o + t_h$.

I. Obtaining $t_h$ $t_h$ is composed of three parts, namely, $t_h = t_{h1} + t_{h2} + t_{h3}$.

(1) $t_{h1}$ is the time from the mobile terminal sending an access request to retransmitting the access request for the last time. Although the mobile terminal also needs to wait for an acknowledgement when retransmitting the access request for the last time, the access request will not be retransmitted any more, and will not occupy the access channel any more. Therefore, the time of waiting for acknowledgement to the last transmission of the access request is not included in $t_{h1}$.

The mobile terminal needs to wait for a response from the system after sending an access request, and decides whether to retransmit the access request according to the response. It is assumed that, after an access request is sent, the maximum waiting time for which the mobile terminal needs to wait is $t_w$. For ease of calculation, $t_w$ is converted into $N_w$ system frame lengths. In a Wide band Code Division Multiple Access (WCDMA) system, one radio frame length is 10 ms. By default, if the mobile terminal receives no response from the system after waiting for $N_w$ frame lengths, it is deemed that the access request fails. In some circumstances, the mobile terminal needs to retransmit the access request repeatedly until the maximum number of retransmissions is hit. Based on the analysis above, $t_{h1}$ may be calculated out through:

$$t_{h1} = (h-1)*N_w \quad (1)$$

In the formula above, h is the average number of the access requests that need to be sent in one handover request process.

It is assumed that ratio of system load to throughput is expressed as $\beta' = s/G$, where S is the throughput, and G is the system load. h may be expressed as:

$$h = G/S \quad (2)$$

The number of retransmissions $h_r$ may be expressed as:

$$h_r = G/S - 1 \quad (2)$$

In a random access channel based on a classical slotted Aloha (S-Aloha) protocol, if the system has $N_r$ channels, the relationship between the load and the throughput is expressed as:

$$S = Ge^{G/N_r} \quad (4)$$

The random access channel in a WCDMA system is based on a randomized slotted-ALOHA protocol, and has better access performance than the random access channel based on the classical slotted Aloha protocol. The relationship between the load and the throughput in the WCDMA system may be expressed as:

$$S = \frac{P[\text{success}](M-\gamma)(1-e^{-G})}{e^{-G} + M(1-e^{-G})} \quad (5)$$

In the formula above, $M = T_m/T_s$, where $T_m$ includes the time spent in sending a preamble, the time from the completion of sending the preamble to sending the access request, and access message duration. $T_s$ is length of an access timeslot. In the WCDMA system, $T_s$ is 1.33 ms, and $\gamma$ is the overhead of sending the preamble.

The relationship between S and G in formula (4) and formula (5) is dynamic. The system load G depends on the group movement speed and the group size. Therefore, the calculation of h is very complicated. A simplified method is used in this application to calculate $t_{h1}$: In a cellular system such as WCDMA and so on, the total number of times of transmitting the access request is limited. It is assumed that the maximum number of retransmissions is $h_{max}$. After transmitting the access request for $h_{max}$ times, the mobile terminal stops retransmitting the access request even if the access is not successful. To minimize the handover failure rate, the value of h is preferably set to $h_{max}$. Therefore, formula (1) may be simplified as:

$$t_{h1} = (h_{max}-1)*N_w \quad (6)$$

In the formula above, $h_{max}$ is a known value in the cellular system.

(2) $t_{h2}$ is the time from the mobile terminal failing in transmitting the access request to sending the access request once more.

After the mobile terminal sends the access request, if the access request conflicts with the access requests sent by other mobile terminals, the mobile terminal needs to back off for $N^b$ frames. $N^b$ is evenly distributed between $N_{min}^b$ and $N_{max}^b$ at random. Therefore, the average number of backoff frames is $\overline{N}^b = \frac{1}{2}(N_{min}^b + N_{max}^b)$, and $t_{h2}$ may be expressed as:

$$t_{h2} = \overline{N}^b*(h-1) = \frac{1}{2}(N_{min}^b + N_{max}^b)(h-1) \quad (7)$$

To ensure handover success, it is better to use the maximum value of $N^b$ than the average value of $N^b$. Therefore, $t_{h2}$ is preferably expressed as:

$$t_{h2} = N_{max}^b*(h_{max}-1) \quad (8)$$

(3) $t_{h3}$ is the delay time accumulated as a result of failing a persistence check throughout the access process.

Every time when the time of sending the access request arrives, the mobile terminal does not send the access request immediately, but performs the persistence check first. If the access request fails the persistence check, the mobile terminal backs off for one frame, and then performs the persistence check again. Once the access request passes the persistence check, the mobile terminal sends the access request. Repeated failure of the persistence check leads to delay of sending the access request.

Upon arrival of the backoff time, the mobile terminal generates a random number X distributed evenly between 0 and 1. If $X>P_p$, where $P_p$ is a persistence probability, the access request passes the persistence check, and the mobile terminal sends the access request; otherwise, the mobile terminal backs off for one frame, and performs the persistence check again. The average number $N_p$ of the persistence checks that need to be performed by the mobile terminal for each retransmission of the access request fulfills aggregate distribution, and the distribution probability is expressed as:

$$P(N_P=k)=P_P(1-P_P)^{k-1}, k=1,2,\ldots,0<P<1 \qquad (9)$$

The average of P may be expressed as:

$$E[N_P] = \sum_{k=1}^{\infty} k * P(N_P = k) = 1/P_p \qquad (10)$$

$t_{h3}$ may be expressed as:

$$t_{h3} = h * E[N_P] = \frac{h}{P_p} \qquad (11)$$

To ensure handover success, it is better to apply the maximum value of h than the average value of h. Therefore, preferably, $t_{h3}$ is expressed as:

$$t_{h3} = h_{max} * E[N_P] = \frac{h_{max}}{P_p} \qquad (12)$$

In view of formulas (6), (8), and (12) above, $t_h$ is expressed as:

$$t_h = (h_{max} - 1)N_w + (h_{max} - 1)N_{max}^b + \frac{h_{max}}{P_p} \qquad (13)$$
$$= (h_{max} - 1)(N_w + N_{max}^b) + \frac{h_{max}}{P_p}$$

II. Obtaining $t_0$

When the group moves, the arrival rate of the location update request messages sent by the group mobile terminals depends on the speed of the group. For example, when the high-speed vehicle crosses the cell border, the arrival rate of the location update request messages sent by the group mobile terminals depends on the movement speed of the high-speed vehicle. To ensure that the handover request messages sent by the group mobile terminals are prior to be handled, it is necessary to consider the impact caused by the location update request message sent by the first arrived group mobile terminals onto the handover request message sent by the last arrived group mobile terminals.

It is assumed that the movement speed of the group is v, and the length of the high-speed vehicle is l. $t_0$ may be expressed as:

$$t_0 = (l/v)/T_f \qquad (14)$$

When l is very small and v is very great, the value of $t_0$ is approximately 0. In formula (14), $T_f$ is length of a radio frame. In the WCDMA system, $T_f$ is equal to 10 ms, and the unit of $t_0$ is a radio frame.

In view of formulas (14) and (13), $T_{g\_ho}$ is expressed as:

$$T_{g\_ho} = (h_{max} - 1)(N_w + N_{max}^b) + \frac{h_{max}}{P_p} + \frac{l}{vT_f} \qquad (15)$$

After completion of the foregoing steps, the minimum backoff time value and the maximum congestion adjustment time value are obtained.

In the method for improving the handover success rate of the group mobile terminals in all embodiments, the handover request message sent by the mobile terminal can be sent to the base station without delay, and the non-handover request message sent by the mobile terminal, such as the location update request messages sent by the group mobile terminals, may be sent to the base station after being delayed for the preset time. In this way, it is ensured that the base station is prior to handle the handover request message, the conflict between other messages and the handover request message is avoided, and the handover failure rate is reduced.

Figure 6:
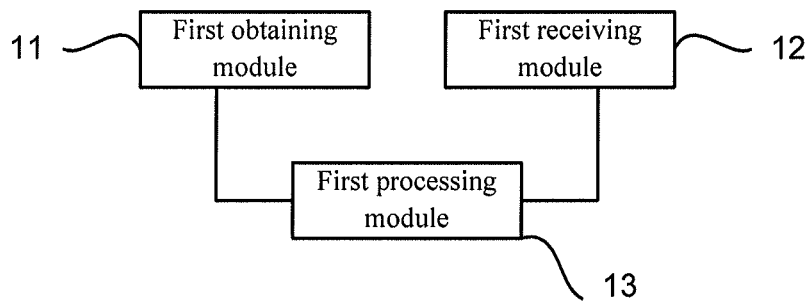
FIG. 6 is a schematic structural diagram of a mobile proxy according to an embodiment.

FIG. 6 is a schematic structural diagram of a mobile proxy according to an embodiment. The mobile proxy includes a first obtaining module 11, a first receiving module 12, and a first processing module 13. The first obtaining module 11 is configured to obtain a minimum backoff time value according to obtained access parameters. The first receiving module 12 is configured to receive messages from group mobile terminals after the group mobile terminals enter a new cell. The first processing module 13 is connected with the first obtaining module 11 and the first receiving module 12 respectively, and is configured to: if a message received by the first receiving module 12 is a handover request message, send the message received by the first receiving module 12 to a base station; if the message received by the first receiving module 12 is not the handover request message, send the message received by the first receiving module 12 to the base station upon expiry of a preset time counted after the first receiving module 12 receives the message, where the preset time is greater than or equal to the minimum backoff time value obtained by the first obtaining module 11.

The first processing module 13 is specifically configured to: if the message received by the first receiving module 12 is a call request message, send the received message to the base station upon expiry of a minimum backoff time counted after the message is received; if the message received by the first receiving module 12 is a location update request message sent by the group mobile terminals, send the received message to the base station upon expiry of a preset time counted after the message is received, where the preset time may be greater than the minimum backoff time value, and less than or equal to a maximum congestion adjustment time value.

Figure 7:
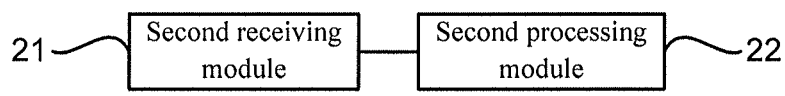
FIG. 7 is a schematic structural diagram of a mobile terminal according to an embodiment.

FIG. 7 is a schematic structural diagram of a mobile terminal according to an embodiment. The mobile terminal may include a second receiving module 21 and a second processing module 22. The second receiving module 21 is configured to receive a minimum backoff time value sent by a base station. The second processing module 21 is connected with the second receiving module 21, and is configured to: send a handover request message to the base station if handover needs to be initiated after entering a new cell; and send a location update request message to the base station upon expiry of a counted preset time, where the preset time may be greater than or equal to the minimum backoff time value.

The second receiving module 21 is further configured to receive a maximum congestion adjustment time value sent by the base station, and the second processing module 22 is specifically configured to: send the handover request message to the base station if handover needs to be initiated after entering the new cell, and start counting time; and send the location update request message to the base station when the count reaches the preset time, where the preset time may be less than or equal to the maximum congestion adjustment time value and greater than the minimum backoff time value.

A communication system provided in an embodiment includes a base station and mobile terminals described in the foregoing embodiments. The base station is configured to obtain the minimum backoff time value, and send the minimum backoff time value to the mobile terminal. The base station is further configured to obtain the maximum congestion adjustment time value, and send the maximum congestion adjustment time value to the mobile terminal.

In the mobile terminal, mobile proxy, and communication system provided in the embodiments, the handover request message sent by the mobile terminal can be sent to the base station without delay, and the non-handover request message sent by the mobile terminal, such as location update request messages sent by the group mobile terminals, may be sent to the base station after being delayed for a preset time. In this way, it is ensured that the base station handles the handover request message first, the conflict between other messages and the handover request message is avoided, and the handover failure rate is reduced.

Persons of ordinary skill in the art should understand that all or part of the steps of the method specified in any embodiment may be implemented by a program instructing relevant hardware. The program may be stored in a computer readable storage medium. When the program runs, the program executes the steps of the foregoing method embodiments. The storage medium may be any medium capable of storing program codes, such as ROM, RAM, magnetic disk, or CD-ROM.

Finally, it should be noted that the above embodiments are merely exemplary, and are not intended to limit the scope of the claims. It is understood that persons of ordinary skill in the art may still make modifications to the technical solutions of the foregoing embodiments or make equivalent replacements to part of the technical characteristics thereof that are understood to fall within the scope of the claims.

What is claimed is:

1. A method for improving a handover success rate of a group of mobile terminals, comprising:
    obtaining, by a mobile proxy, a maximum congestion adjustment time value according to obtained access parameters, wherein the maximum congestion adjustment time value is a maximum delay time value for adjusting an arrival rate of location update request messages;
    obtaining, by the mobile proxy, a minimum backoff time value according to the obtained access parameters, wherein the minimum backoff time value is less than the maximum congestion adjustment time value;
    receiving, by the mobile proxy, a message from a mobile terminal after entering a new cell;
    if the message is a handover request message, sending, by the mobile proxy, the message to a base station without waiting for expiry of a predetermined time after the message is received;
    if the message is not the handover request message, sending, by the mobile proxy, the received message to the base station upon the expiry of the predetermined time after the message is received, wherein the predetermined time is greater than or equal to the minimum backoff time value, and the minimum backoff time value is a minimum time value of the predetermined time when the message received from the mobile terminal is not the handover request message, and the predetermined time is less than or equal to the maximum congestion adjustment time value.

2. The method according to claim 1, wherein the if the message is not the handover request message, sending, by the mobile proxy, the received message to the base station the upon expiry of the predetermined time after the message is received comprises:
    if the message is a call request message, measuring, by the mobile proxy, an amount of time that has elapsed since receiving the message, and sending, by the mobile proxy, the received message to the base station when the elapsed time reaches the minimum backoff time value; and
    if the message is a location update request message from the group of mobile terminals, measuring, by the mobile proxy, an amount of time that has elapsed since receiving the message, and sending, by the mobile proxy, the received message to the base station when the elapsed time reaches the predetermined time, wherein the predetermined time is greater than the minimum backoff time value, and less than or equal to the maximum congestion adjustment time value.

3. The method according to claim 1, wherein the access parameters comprise at least one of: a number of mobile terminals in a group, a movement speed of the group, and an access bandwidth of the new cell.

4. The method according to claim 1, wherein obtaining, by the mobile proxy, of the minimum backoff time value according to the obtained access parameters comprises:
    obtaining, by the mobile proxy, according to the obtained access parameters, a duration $Tg\_ho$ from a time when the group of mobile terminals arrive at a cell, to a time when a system access channel finishes handling handover requests from all the mobile terminals in the group;
    obtaining, by the mobile proxy, a time value $Tg\_nlu$, for regulating the arrival rate of the location update request messages from the group mobile terminals; and
    obtaining, by the mobile proxy, the minimum backoff time value according to $Tg\_ho$ and $Tg\_nlu$; and
    wherein obtaining of the maximum congestion adjustment time value according to the access parameters comprises:
    obtaining, by the mobile proxy, according to the obtained access parameters, the duration $Tg\_ho$ from the time when the group of mobile terminals arrives at the cell to the time when the system access channel finishes handling the handover requests from all the mobile terminals in the group;
    obtaining, by the mobile proxy, the time value $Tg\_nlu$ for regulating the arrival rate of the location update request messages from the group mobile terminals; and
    obtaining, by the mobile proxy, the maximum congestion adjustment time value according to $Tg\_ho$ and $Tg\_nlh$.

5. A method for improving a handover success rate of a group mobile terminals, comprising:
    receiving, by a mobile terminal, a maximum congestion adjustment time value from the base station, wherein the maximum congestion adjustment time value corresponds to a maximum delay time value for adjusting an arrival rate of location update request messages;
    receiving by the mobile terminal, a minimum backoff time value from a base station; and sending, by the mobile terminal, a handover request message to the base station without waiting for expiry of a predetermined time if a handover needs to be initiated after entering a new cell;

sending, by the mobile terminal, a location update request message to the base station after the predetermined time if a location update needs to be initiated, wherein the predetermined time is greater than or equal to the minimum backoff time value, and the minimum backoff time value is a minimum time value of the predetermined time, allowing, by the mobile terminal, the predetermined time to be less than or equal to the maximum congestion adjustment time value; and if a call request message needs to be sent, allowing, by the mobile terminal, the predetermined time be equal to the minimum backoff time value.

6. A mobile proxy, comprising:

a first obtaining module configured to obtain a minimum backoff time value according to obtained access parameters;

a first receiving module configured to receive messages from a group of mobile terminals after the group of mobile terminals enter a new cell; and a first processing module configured to:

if the message received by the first receiving module is a handover request message, send the message to a base station without waiting for expiry of a predetermined time after the message is received;

if the message is not the handover request message, send the message received by the first receiving module to the base station after the predetermined time from when the first receiving module receives the message, wherein the predetermined time is greater than or equal to the minimum backoff time value, and the minimum backoff time value is a minimum time value of the predetermined time when the received message from the mobile terminal is not the handover request message, wherein:

if the message received by the first receiving module is a call request message, send the received message to the base station after an elapsed time from when the message is received equals the minimum backoff time;

if the message received by the first receiving module is a location update request message from the group of mobile terminals, send the received message to the base station after an elapsed time from when the message is received equals the predetermined time, wherein the predetermined time is greater than the minimum backoff time value, and less than or equal to the maximum congestion adjustment time value.

7. A mobile terminal, comprising:

a receiving module configured to receive a minimum backoff time value from a base station, and receive a maximum congestion adjustment time value from the base station, wherein the maximum congestion adjustment time value is a maximum delay time value for adjusting an arrival rate of location update request messages;

a processing module configured to:

send a handover request message to the base station without waiting for expiry of a predetermined time if a handover needs to be initiated after entering a new cell;

send a location update request message to the base station after the predetermined time, wherein the predetermined time is greater than or equal to the minimum backoff time value, and the minimum backoff time value is a minimum time value of the predetermined time;

send the handover request message to the base station if the handover needs to be initiated after entering the new cell, and to measure an elapsed time; and send the location update request message to the base station when the elapsed time reaches the predetermined time, wherein the predetermined time is less than or equal to the maximum congestion adjustment time value.

* * * * *